(12) United States Patent
Bartsch et al.

(10) Patent No.: US 12,527,612 B2
(45) Date of Patent: Jan. 20, 2026

(54) SURGICAL INSTRUMENT FOR TRANSMITTING TORQUE

(71) Applicant: Stryker European Operations Limited, Carrigtwohill (IE)

(72) Inventors: Matthias Bartsch, Schoenkirchen (DE); Tobias Boehm, Kiel (DE)

(73) Assignee: Stryker European Operations Limited, Carrigtwohill (IE)

( * ) Notice: Subject to any disclaimer, the term of this patent is extended or adjusted under 35 U.S.C. 154(b) by 534 days.

(21) Appl. No.: 17/968,445

(22) Filed: Oct. 18, 2022

(65) Prior Publication Data

US 2023/0121028 A1    Apr. 20, 2023

(30) Foreign Application Priority Data

Oct. 19, 2021  (EP) .................................... 21203378

(51) Int. Cl.
   *A61B 17/88*   (2006.01)
   *A61B 17/70*   (2006.01)
   (Continued)

(52) U.S. Cl.
   CPC ...... *A61B 17/8875* (2013.01); *A61B 17/7082* (2013.01); *B25B 23/0021* (2013.01);
   (Continued)

(58) Field of Classification Search
   CPC ............ A61B 17/1631; A61B 17/7076; A61B 17/7082; A61B 17/8875; B25B 23/0014; B25B 23/0021; B25B 23/0028
   See application file for complete search history.

(56) References Cited

U.S. PATENT DOCUMENTS

| 3,203,285 | A | * | 8/1965 | Schmidt | ................ | F16M 11/40 |
| | | | | | | 403/291 |
| 4,706,659 | A | * | 11/1987 | Matthews | .............. | B25G 1/025 |
| | | | | | | 464/57 |

(Continued)

FOREIGN PATENT DOCUMENTS

| DE | 604902 C | 10/1934 |
| DE | 606376 C | 11/1934 |

(Continued)

OTHER PUBLICATIONS

Extended European Search Report including Written Opinion for Application No. 21203378.1 dated Mar. 9, 2022, pp. 1-9.

*Primary Examiner* — Larry E Waggle, Jr.
(74) *Attorney, Agent, or Firm* — Lerner David LLP

(57) ABSTRACT

A surgical instrument for transmitting torque is described. The surgical instrument comprises a torque receiving portion at a proximal end of the surgical instrument, a torque delivering portion at a distal end of the surgical instrument, and a flexible shaft extending between the torque receiving portion and the torque delivering portion. The flexible shaft comprises torque transmitting elements coupled in series along a longitudinal direction of the shaft such that one of the torque transmitting elements is rotationally fixed and tiltable relative to an adjacent one of the torque transmitting elements, wherein each of the torque transmitting elements comprises a through-hole. The surgical instrument also comprises an elongate alignment member extending through the through-holes of the torque transmitting elements, wherein the alignment member is made from a spring-elastic material. The present disclosure further provides a system comprising the surgical instrument and a method of using the surgical instrument.

20 Claims, 7 Drawing Sheets

(51) Int. Cl.
*B25B 23/00* (2006.01)
*A61B 17/00* (2006.01)

(52) U.S. Cl.
CPC ............... *A61B 2017/00398* (2013.01); *A61B 2017/00477* (2013.01)

(56) References Cited

U.S. PATENT DOCUMENTS

| | | | |
|---|---|---|---|
| 4,753,223 A | 6/1988 | Bremer | |
| 5,455,997 A * | 10/1995 | Nasiell | B25B 13/481 |
| | | | 29/888.011 |
| 5,797,918 A * | 8/1998 | McGuire | A61B 17/1714 |
| | | | 606/104 |
| 6,017,340 A | 1/2000 | Cassidy et al. | |
| 6,952,986 B2 | 10/2005 | Fu | |
| 7,634,874 B2 | 12/2009 | Lucas | |
| 8,495,934 B2 | 7/2013 | Schneider et al. | |
| 9,498,264 B2 * | 11/2016 | Harshman | A61B 17/7208 |
| 10,524,805 B2 * | 1/2020 | Zilberman | A61B 17/1642 |
| 2012/0132038 A1 * | 5/2012 | Lefler | B25G 1/025 |
| | | | 81/177.6 |
| 2013/0071599 A1 | 3/2013 | Kraibuehler et al. | |
| 2014/0069240 A1 * | 3/2014 | Dauvin | B25B 23/0028 |
| | | | 464/111 |
| 2023/0117546 A1 * | 4/2023 | Simon | A61B 17/8875 |
| | | | 81/177.6 |

FOREIGN PATENT DOCUMENTS

| | | |
|---|---|---|
| DE | 102015112893 A1 | 2/2017 |
| EP | 1416109 B1 | 11/2014 |
| EP | 2739456 B1 | 3/2019 |
| GB | 2220729 A | 1/1990 |
| GB | 2517490 B | 8/2015 |
| WO | 2011080104 A1 | 7/2011 |
| WO | 2013033478 A2 | 3/2013 |
| WO | 2015121869 A1 | 8/2015 |
| WO | 2015134750 A1 | 9/2015 |
| WO | 2018158388 A2 | 9/2018 |

* cited by examiner

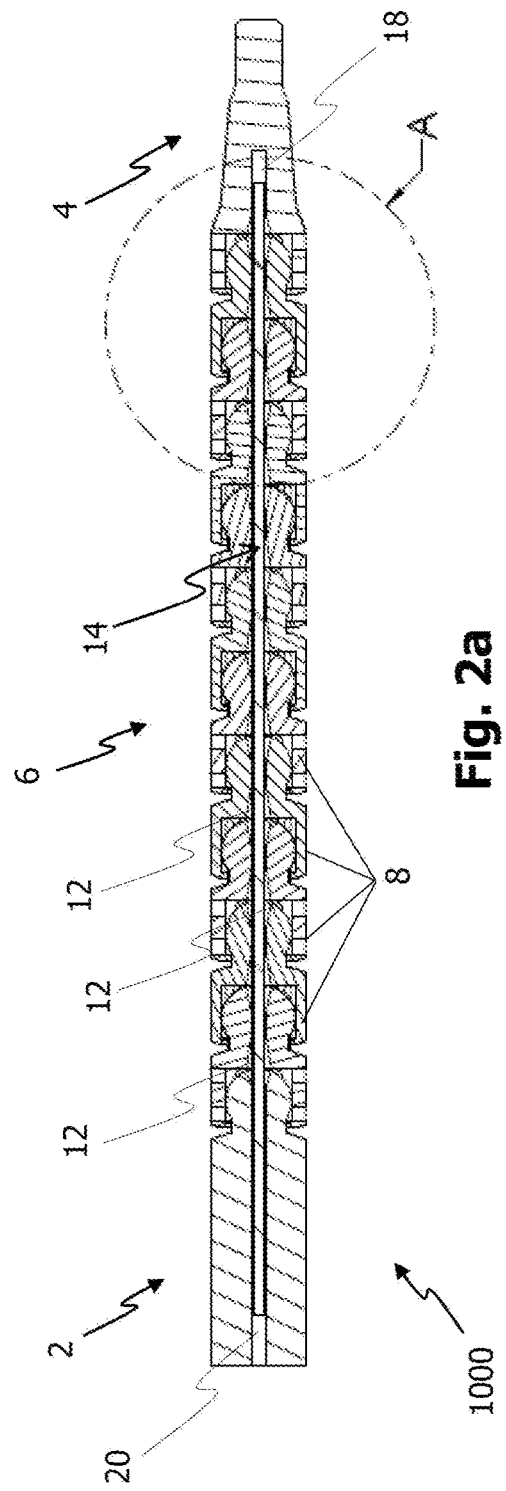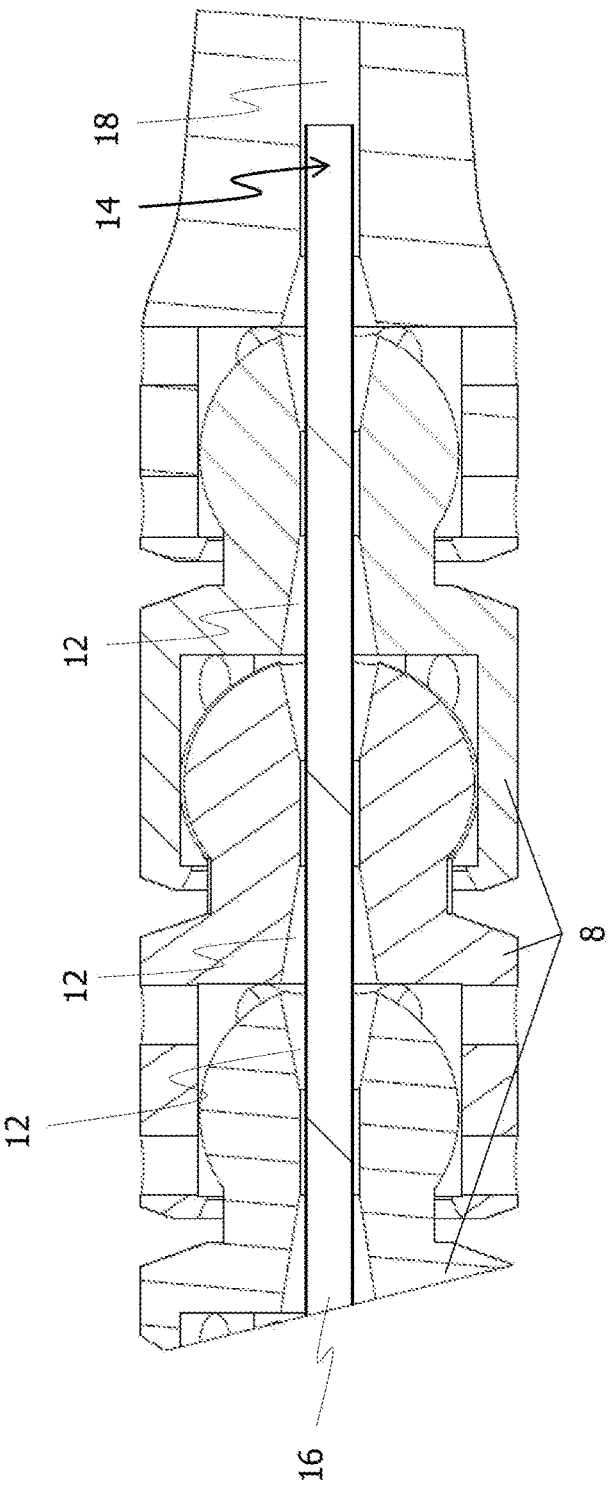
Fig. 2a
Fig. 2b

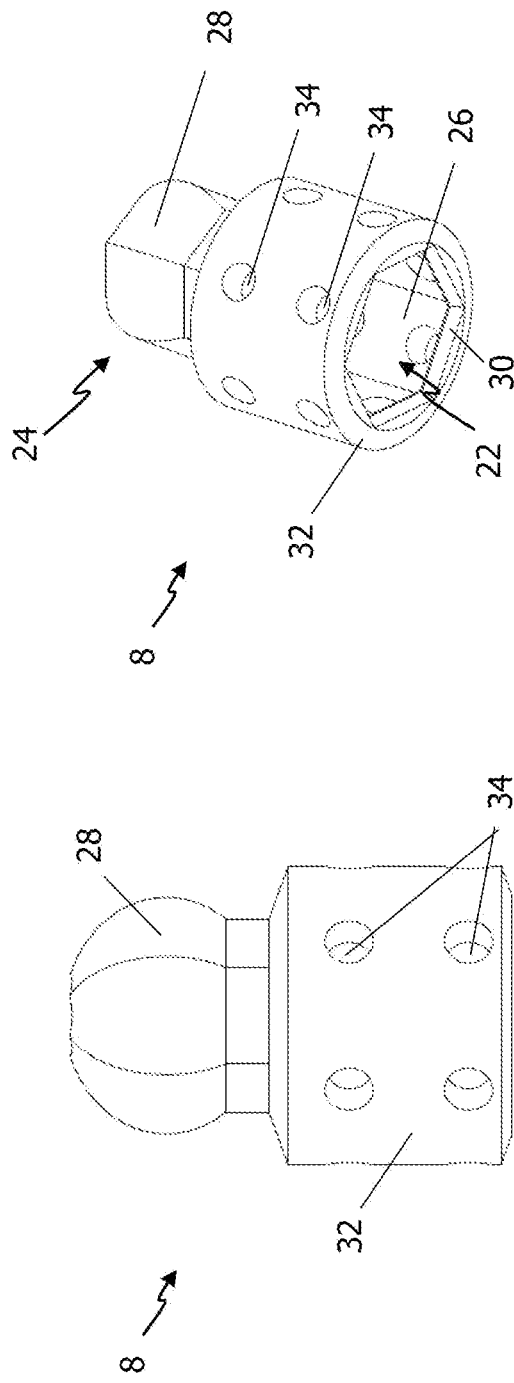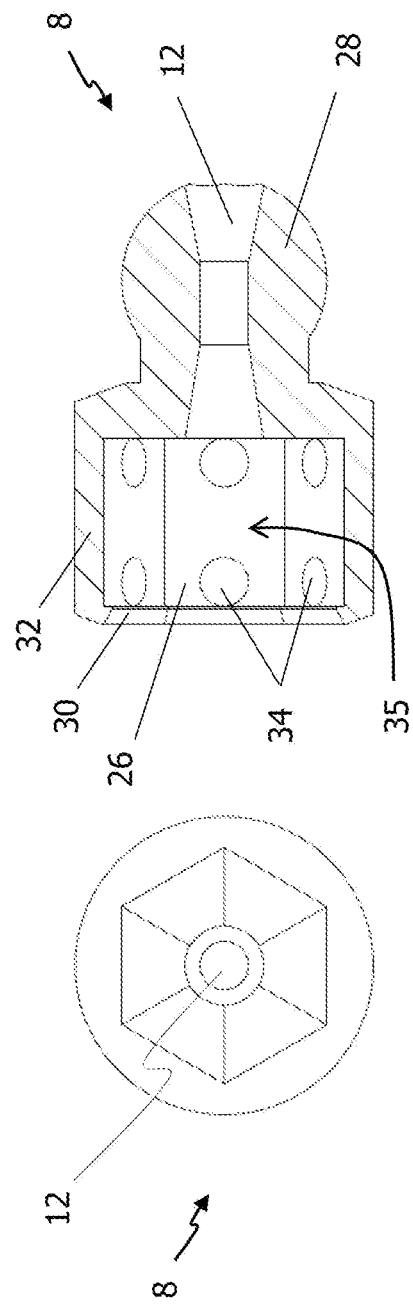

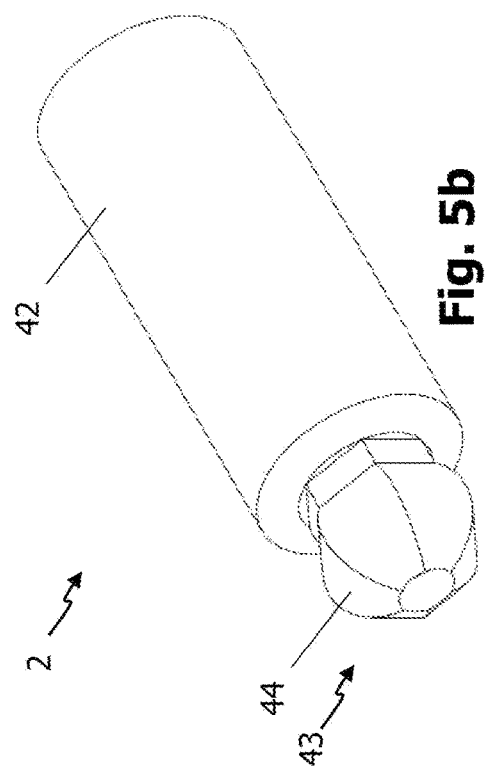
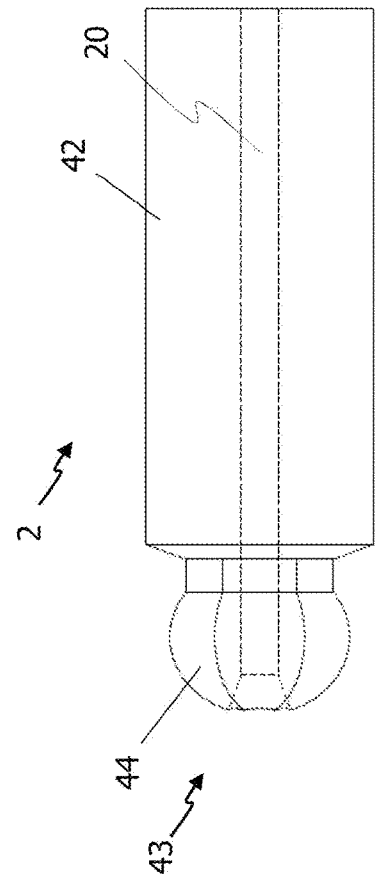
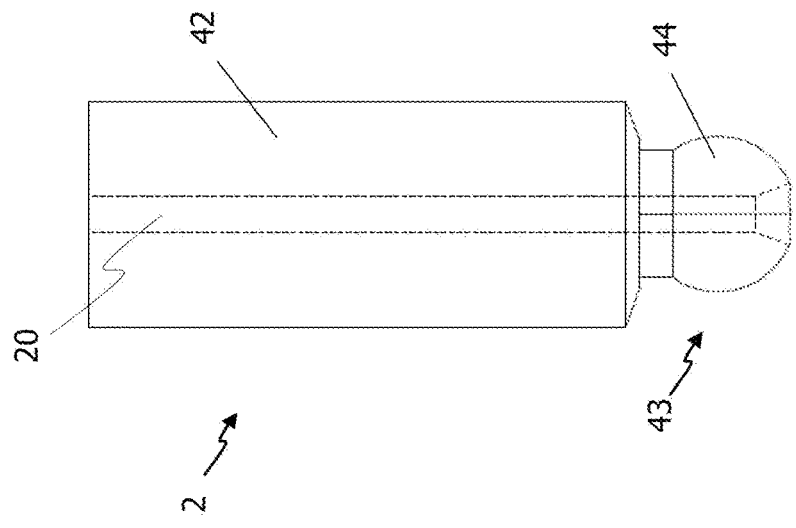
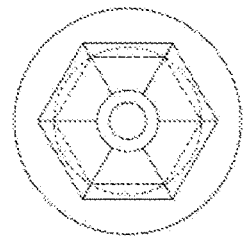

SURGICAL INSTRUMENT FOR TRANSMITTING TORQUE

CROSS-REFERENCE TO RELATED APPLICATIONS

This application claims the benefit of the filing date of European Patent Application No. 21203387.1 filed Oct. 19, 2021, the disclosure of which is hereby incorporated herein by reference.

TECHNICAL FIELD

The present disclosure generally relates to a surgical instrument for transmitting torque, a system comprising the surgical instrument and a method of using the surgical instrument.

BACKGROUND

In several surgical scenarios, surgical screws need to be fastened or holes need to be drilled. For this purpose, torque-activated tool portions such as screw-driving blades or surgical drill heads may be used. The screw-driving blade needs to be turned to fasten a surgical screw, and the drill head needs to be turned to drill a hole into bone.

Commonly used surgical instruments with torque-activated tool portions are rigid and non-flexible. In certain use cases, the surgical screw or the drilling position may be hard or even impossible to reach using such rigid, non-flexible instruments. To address this issue, flexible surgical instruments have been developed that allow for an adjustment of a relative orientation between, for example, a handle of the instrument and the torque-activated tool portion by providing a bendable shaft interconnecting the handle and the torque-activated tool portion.

Current flexible surgical instruments often suffer from one or more drawbacks. For instance, they may be hard to align relative to a position of interest, and may be hard to clean and sterilize. Known flexible surgical instruments may be prone to breaking upon exertion of high torques, potentially leading to parts of the instruments being left inside a patient's body after surgery. Still further, such known flexible instruments may be hard to manufacture, thereby increasing costs.

SUMMARY

There is a need for a surgical instrument for transmitting torque that solves one or more of the aforementioned or other problems.

According to a first aspect, a surgical instrument for transmitting torque is provided. The surgical instrument comprises a torque receiving portion at a proximal end of the surgical instrument, and a torque delivering portion at a distal end of the surgical instrument. The surgical instrument further comprises a flexible shaft extending between the torque receiving portion and the torque delivering portion, the flexible shaft comprising torque transmitting elements coupled in series along a longitudinal direction of the shaft such that one of the torque transmitting elements is rotationally fixed and tiltable relative to an adjacent one of the torque transmitting elements, wherein each of the torque transmitting elements comprises a through-hole. The surgical instrument further comprises an elongate alignment member extending through the through-holes of the torque transmitting elements, wherein the alignment member is made from a spring-elastic material.

In the surgical instrument, the torque transmitting elements may be rotationally fixed with respect to rotation around the longitudinal direction of the shaft. The torque transmitting elements may be coupled such that a torque applied around the longitudinal direction of the shaft at one of the torque transmitting elements is transmitted to all others of the torque transmitting elements.

The one of the torque transmitting elements may be tiltable relative to the adjacent one of the torque transmitting elements to allow (e.g., a reversible) bending of the flexible shaft. The flexible shaft and the alignment member may be configured such that a relative pose between (e.g., a longitudinal axis of) the torque receiving portion and (e.g., a longitudinal axis of) the torque delivering portion can be reversibly changed. The alignment member may be the only component extending through the through-holes of the torque transmitting elements.

The spring-elastic material may be a superelastic or pseudoelastic material. The spring-elastic material may be a shape memory material, such as a shape memory alloy. The spring-elastic material may be a nickel titanium alloy, for example Nitinol.

The alignment member may be made from a single piece of material. The alignment member may comprise or consist of a spring wire. The spring wire may not form a coil. In other words, the spring wire may not be rolled, wrapped or wound. The spring wire may be a non-braided wire. The spring wire may have a substantially polygonal or circular cross-section. The spring wire may extend along the longitudinal direction of the shaft. In its unbiased state, the spring wire may extend in a linear direction, for example at least within each of the through-holes.

The alignment member, such as the spring wire, may be configured as a bending spring or a leaf spring. The alignment member may be configured to be elastically deformed when the shaft is bent. The alignment member may be configured to, when the shaft is bent, provide a spring force counteracting the bending of the shaft.

The alignment member may be configured to align the torque transmitting elements in a predefined orientation relative to one another. The alignment member may be configured to align the torque transmitting elements such that the longitudinal direction of the shaft extends in a linear direction.

The alignment member may be configured to, when the torque transmitting elements are in the predefined orientation relative to one another, fulfil at least one of the following criteria:
  a) the alignment member is in a state of a lowest elastic potential energy;
  b) the alignment member is free from a shear force;
  c) the alignment member is free from a bending moment;
  d) the alignment member is free from a tensile force.

The surgical instrument may comprise at least one recess facing the shaft, the at least one recess being formed in at least one component of the surgical instrument chosen from the torque receiving portion and the torque delivering portion. The alignment member may extend into the at least one recess. The alignment member may be configured to align the shaft in a predefined orientation relative to the at least one component.

The alignment member may be configured to, when the shaft is in the predefined orientation relative to the at least one component, fulfil at least one of the following criteria:

a) the alignment member is in a state of a lowest elastic potential energy;
b) the alignment member is free from a shear force;
c) the alignment member is free from a bending moment;
d) the alignment member is free from a tensile force.

The alignment member may be configured to extend linearly when being in the state of a lowest elastic potential energy.

The alignment member may be translationally movable along at least one direction chosen from the longitudinal direction of the shaft, a first longitudinal axis of the torque delivering portion and a second longitudinal axis of the torque receiving portion. The alignment member may not be attached to one or more components of the surgical instrument chosen from the torque receiving portion, the torque delivering portion and the shaft. As an example, the alignment member may loosely abut one or more of these components.

The through-hole may extend in the longitudinal direction of the shaft. The through-hole may extend in a center of the torque transmitting element comprising the through-hole. The through-hole may have a varying diameter. The through-hole may have a wider diameter at one or both ends of the through hole compared with a portion of the through hole spaced apart from the respective end of the through hole. The wider diameter may be formed by a conical part of the through hole or a rounded surface of the torque transmitting element comprising the through-hole.

A first one of the torque transmitting elements may be coupled to the torque receiving portion such that the first one of the torque transmitting elements is rotationally fixed and tiltable relative to the torque receiving portion. A second of the torque transmitting elements may be coupled to the torque delivering portion such that the second of the torque transmitting elements is rotationally fixed and tiltable relative to the torque delivering portion. The flexible shaft may be coupled to both the torque receiving portion and the torque delivering portion. A torque applied at the torque receiving portion around a longitudinal axis of the torque receiving portion may be transmitted via the torque transmitting elements to rotate the torque delivering portion around a longitudinal axis of the torque delivering portion. A torque applied at the torque receiving portion around a longitudinal axis of the torque receiving portion may result in a (e.g., essentially similar) torque at the torque delivering portion around the longitudinal axis of the torque delivering portion.

The shaft may be configured to transmit torques larger than a predefined torque from the torque receiving portion to the torque delivering portion. At least one component chosen from the torque receiving portion and torque delivering portion may be configured to deform upon being subjected to a torque larger than the predefined torque.

At least two of the torque transmitting elements may be manufactured, by additive manufacturing, being coupled to one another in series. Alternatively or additionally, at least one component of the surgical instrument chosen from the torque receiving portion and the torque delivering portion may be manufactured, by additive manufacturing, being coupled to one (e.g., the first or second) of the torque transmitting elements.

The torque transmitting elements may be coupled in series such that each of the torque transmitting elements is translationally fixed, at least in the longitudinal direction of the shaft, relative to an adjacent one of the torque transmitting elements.

One of the torque transmitting elements may comprise a female coupling feature and an adjacent one of the torque transmitting elements (e.g., adjacent to the one of the torque transmitting elements) may comprise a male coupling feature matching the female coupling feature. The one of the torque transmitting elements may be coupled to the adjacent one of the torque transmitting elements via the female coupling feature and the male coupling feature.

One or more, or all, of the torque transmitting elements may comprise a female coupling feature and a male coupling feature (e.g., matching the female coupling feature). The torque transmitting elements may be identical to one another. Alternatively, at least one of the torque transmitting elements may comprise two female coupling features or two male coupling features. In both variants, the two coupling features of a torque transmitting element may be rotationally offset from one another.

The torque transmitting elements may be coupled in series by the female coupling features and the male coupling features of the torque transmitting elements.

In a first variant, the female coupling feature may comprise a receptacle (e.g., for the male coupling feature of the adjacent one of the torque transmitting elements). The receptacle may be circumferentially (e.g., substantially) closed. The receptacle may be (e.g., essentially) bucket-shaped. The male coupling feature may comprise or consist of a protrusion sized to fit into the receptacle (e.g., of the one of the torque transmitting elements). The receptacle may have a polygonal inner circumference matching an outer circumference of the protrusion. The protrusion may have a varying thickness along the longitudinal direction of the shaft. A cross-section of the protrusion in a plane along the longitudinal direction of the shaft may be at least partially spherical. The female coupling feature may further comprise a retainment feature (e.g., a retainment lip) extending radially inwards from an inner surface of the receptacle. The retainment feature may be configured to prevent a decoupling of the protrusion of the adjacent one of the torque transmitting elements coupled to the receptacle. The receptacle may be radially enclosed by a side wall of the torque transmitting element comprising the receptacle. The side wall may comprise at least one through-hole connecting a space within the receptacle with a space outside the receptacle. A contact area of an inner surface of the receptacle may be configured to contact an outer surface of the protrusion of the adjacent one of the torque transmitting elements coupled to the receptacle, wherein the at least one through-hole may be arranged distant from the contact area.

The torque delivering portion may comprise a screw-driving tool portion (e.g., a blade or Torx-type feature) adapted for fastening a surgical screw. The surgical instrument may be configured as a screw driver. Alternatively, the torque delivering portion may comprise a surgical drill head adapted for drilling holes into bone. The surgical instrument may be configured as a drill.

The surgical instrument may further comprise a handle attached or coupled to the torque receiving portion. The handle may be configured to transmit a torque applied around the longitudinal axis of the torque receiving portion to the torque receiving portion.

According to a second aspect, a system is provided. The system comprises the surgical instrument according to the first aspect. The system further comprises an implant placement instrument comprising a handle and a coupling portion configured to removably couple to an implant, the implant placement instrument further comprising a guiding structure configured to guide the torque delivering portion of the surgical instrument to a predefined position relative to the coupling portion, the guiding structure comprising a channel extending along a curve. The channel may be circumferentially closed or may have an opening along its longitudinal extension.

The system may further comprise the implant. The implant may comprise two implant portions movably attachable to one another. The implant may further comprise a locking mechanism configured to lock the two implant portions relative to one another. The locking mechanism may comprise a surgical screw. The guiding structure may be configured to guide the torque delivering portion of the surgical instrument to a head of the surgical screw for enabling screw fastening or loosening.

A first of the two implant portions may be an intramedullary nail and a second of the two implant portions may be a bone fastener configured to penetrate a transverse bore of the intramedullary nail to movably attach to the intramedullary nail. The locking mechanism may further comprise a screw thread extending along a longitudinal axis of the intramedullary nail. The surgical screw of the locking mechanism may be configured to couple with the screw thread.

According to a third aspect, a method of using a surgical instrument is provided. The method comprises positioning the surgical instrument according to the first aspect such that first a longitudinal axis of the torque delivering portion is tilted relative to a longitudinal screw axis of a surgical screw. The method further comprises bending the flexible shaft of the surgical instrument into a bent shape in which (i) the first longitudinal axis coincides with the longitudinal screw axis and (ii) the first longitudinal axis is offset from a second longitudinal axis of the torque receiving portion, tilted relative to the second longitudinal axis or skew relative to the second longitudinal axis. The method further comprises coupling the torque delivering portion of the surgical instrument to a head of the surgical screw, and applying a torque at the torque receiving portion of the surgical instrument to turn the surgical screw while the flexible shaft is in the bent shape.

The surgical instrument used in the method according the third aspect may be part of the system according to the second aspect. Bending the shaft may comprise at least one action chosen from bending the shaft to conform with at least a part of the curve and advancing the torque delivering portion of the surgical instrument along the guiding structure. Bending the shaft may comprise advancing the torque delivering portion of the surgical instrument along the guiding structure, thereby bending the shaft to conform with at least a part of the curve. The surgical screw may be part of the implant of the system according to the second aspect.

The method in a first example may optionally further comprise implanting the implant in the patient's body before bending the flexible shaft of the surgical instrument.

It is to be noted that the step of implanting the implant may not be part of the method. The method may not involve any significant interaction with a human or animal body and in particular not comprise a surgical step.

The instrument disclosed herein may be not be limited for use in surgery. The instrument disclosed herein may be usable in non-surgical scenarios. In one particular variant, the instrument disclosed herein may be referred to as "torque-transmitting" instrument, instead of "surgical" instrument.

BRIEF DESCRIPTION OF THE DRAWINGS

Further details, advantages and aspects of the present disclosure will become apparent from the following embodiments taken in conjunction with the drawings, wherein:

FIG. 2a shows a longitudinal cross-section of the surgical instrument of FIG. 1;

FIG. 2b shows an enlarged portion A of the cross-section of FIG. 2a;

FIGS. 3a-3d show different views of a torque transmitting element of the surgical instrument of FIG. 1;

FIGS. 5a-5d show different views of a torque receiving portion of the surgical instrument of FIG. 1;

DETAILED DESCRIPTION

Figure 1:
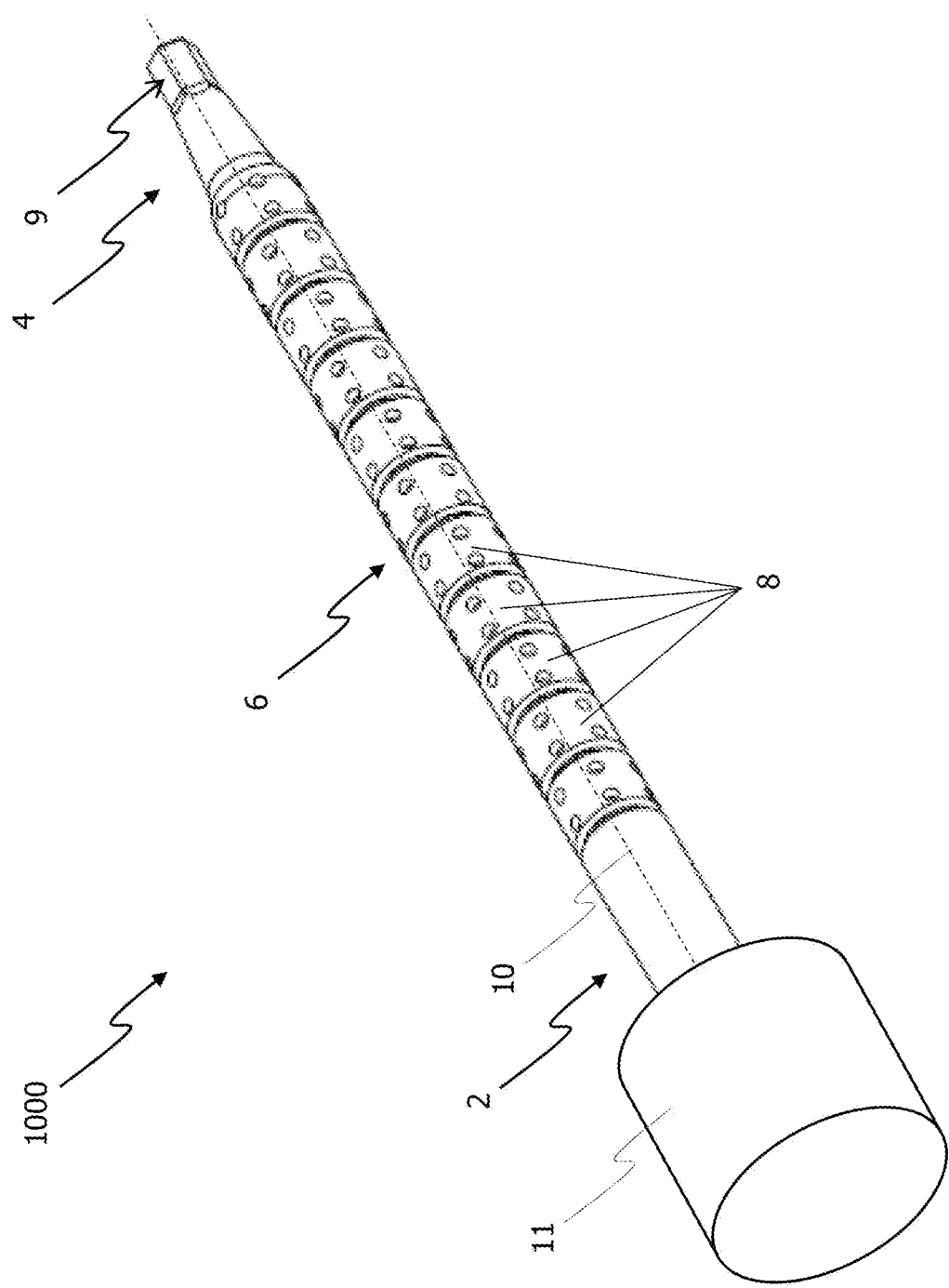
FIG. 1 shows an embodiment of a surgical instrument in accordance with the present disclosure.
Figure 4B:
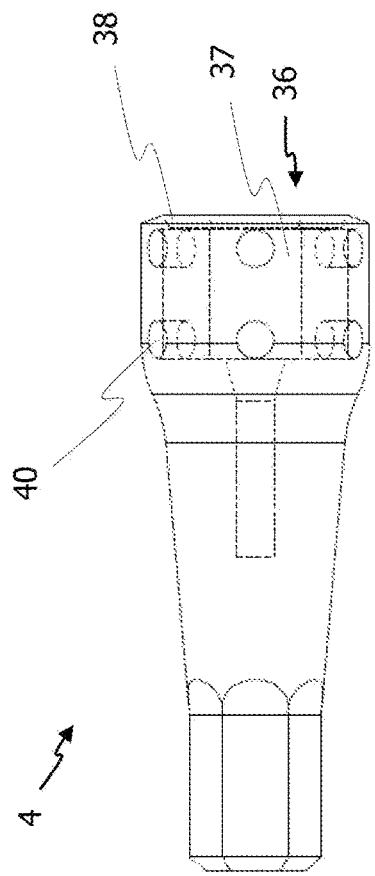
FIGS. 4a-4d show different views of a torque delivering portion of the surgical instrument of FIG. 1.
Figure 4A:
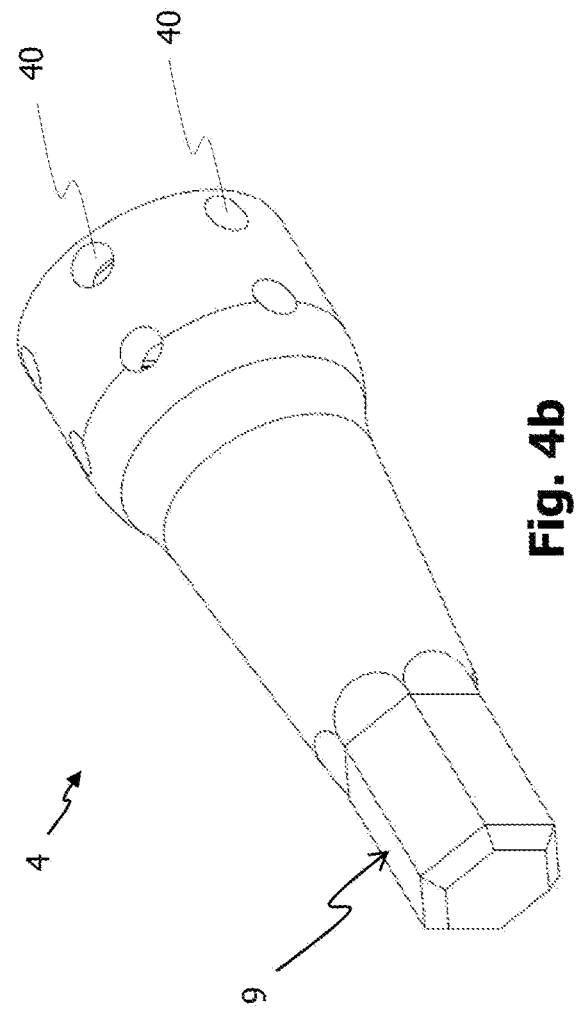
Figure 4D:
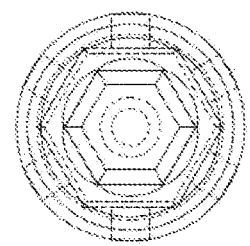
Figure 4C:
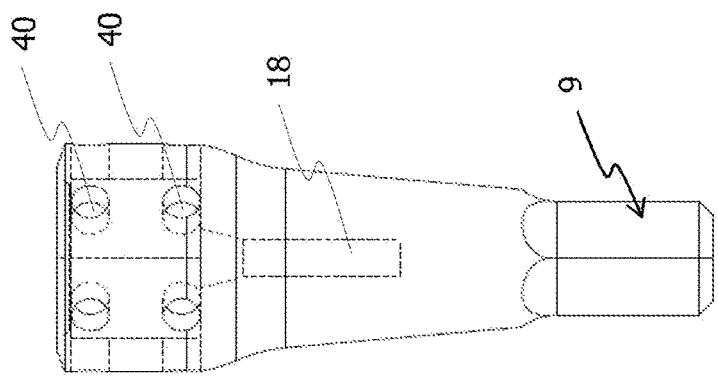

In the following description, exemplary embodiments of a surgical instrument, a system comprising the surgical instrument and a method of using same will be explained with reference to the drawings. The same reference numerals will be used to denote the same or similar structural features.

FIG. 1 shows an embodiment of a surgical instrument 1000 in accordance with the present disclosure. The surgical instrument 1000 is adapted for transmitting torque. The surgical instrument 1000 comprises a torque receiving portion 2 at a proximal end of the surgical instrument 1000 and a torque delivering portion 4 at a distal end of the surgical instrument 1000. The surgical instrument 1000 further comprises a flexible shaft 6 extending between the torque receiving portion 2 and the torque delivering portion 4. The flexible shaft 6 comprises a plurality of torque transmitting elements 8. The plurality of torque transmitting elements 8 are coupled in series along a longitudinal direction 10 of the shaft 6 such that each of the torque transmitting elements 8 is rotationally fixed and tiltable relative to an adjacent one of the plurality of torque transmitting elements 8. In some variants, the shaft 6 may comprise between 4 and 40 (e.g., between 10 and 25) torque transmitting elements 8.

One may say that the plurality of torque transmitting elements 8 form a chain along the longitudinal direction 10 of the shaft 6. In other words, the shaft 6 may be formed by the plurality of coupled or interlinked torque transmitting elements 8. The shaft 6 may be flexible in that it is (e.g., reversibly) bendable. That is, an extension of the shaft may be changed from a linear extension to a curved extension and vice versa. Put differently, the shaft 6 may be reversibly bent from a first shape into a second shape from the first shape. The shaft 6 may be bendable by changing a relative orientation between the torque receiving portion 2 and the torque delivering portion 4.

Each of the plurality of torque transmitting elements 8 may be tiltable relative to an adjacent one of the plurality of torque transmitting elements 8 by changing an angle between an (e.g., central, longitudinal or rotational) axis of the torque transmitting element 8 relative to an (e.g., central, longitudinal or rotational) axis of the adjacent one of the plurality of torque transmitting elements 8. The two axes may be part of or define at least a part of the longitudinal direction 10. By tilting the torque transmitting elements 8 relative to one another, the shape of the shaft 6 may be changed in regard to its extension between the torque receiving portion 2 and the torque delivering portion 4. One may say that by bending the shaft 6, at least some of the plurality of torque transmitting elements 8 are tilted relative to one another.

The plurality of torque transmitting elements 8 may be rotationally fixed relative to one another such that a torque applied around the longitudinal direction 10 of the shaft 6 at one of the plurality of torque transmitting elements 8 is transmitted to all others of the plurality of torque transmitting elements 8. The flexible shaft 6 may be configured such that the shaft can be bent whilst permitting a transmission of torque between the plurality of torque transmitting elements 8 around the longitudinal direction 10 of the shaft 6. The shaft 6 may have an overall cylindrical shape. Each of the plurality of torque transmitting elements 8 may have an essentially cylindrical outer surface forming part of an overall cylindrical outer surface of the shaft 6. Each of the plurality of torque transmitting elements 8 may have the same geometry. Each of the plurality of torque transmitting elements 8 may be rotationally offset from a respective adjacent one of the plurality of torque transmitting elements 8 of the shaft 6.

A first one of the plurality of torque transmitting elements 8 may be coupled to the torque receiving portion 2 such that the first of the plurality of torque transmitting elements 8 is rotationally fixed and tiltable relative to the torque receiving portion 2. A second one of the plurality of torque transmitting elements 8 may be coupled to the torque delivering portion 4 such that the second of the plurality of torque transmitting elements 8 is rotationally fixed and tiltable relative to the torque delivering portion 4. In an alternative implementation, the torque receiving portion 2 may be (e.g., fixedly or non-tiltably) attached to the first of the plurality of torque transmitting elements 8 and/or the torque delivering portion 4 may be (e.g., fixedly or non-tiltably) attached to the second of the plurality of torque transmitting elements 8.

The flexible shaft 6 may be coupled or rigidly attached to both the torque receiving portion 2 and the torque delivering portion 4. This may ensure that a torque applied at the torque receiving portion 2 around the longitudinal direction 10 is transmitted via the plurality of torque transmitting elements 8 to rotate the torque delivering portion 4 around the longitudinal direction 10. An input torque applied at the torque receiving portion 2 around a longitudinal axis of the torque receiving portion 2 may result in an output torque at the torque delivering portion 4 around the longitudinal axis of the torque delivering portion 4, even if the longitudinal axis of the torque receiving portion 2 is angled or skew relative to the longitudinal axis of the torque delivering portion 4.

The torque delivering portion 4 may comprise a screw-driving tool portion 9 adapted for fastening a surgical screw. In this case, the surgical instrument 1000 may be configured as a screwdriver. The screw driving tool portion 9 may be configured as a hexagonal screw-driving portion. The screw driving tool portion 9 may be a hexagonal screw-driving portion in the standardized size SW4. Other forms of the screw-driving portion are also possible (e.g., slot-type blades, cross-type blades, square or star). Alternatively, the torque delivering portion may comprise a surgical drill head (not shown) adapted for drilling holes into bone (i.e., the surgical instrument 1000 may be configured as a drill).

The torque receiving portion 2 may be configured to be coupled to a handle or an electrical actuator such as a motor. As illustrated in the example shown in FIG. 1, the surgical instrument 1000 may further comprise a handle 11 attached or coupled to the torque receiving portion 2. The handle 11 may be configured to transmit a torque applied around a longitudinal axis of the handle 11 to the torque receiving portion. The handle 11 may thus be rotationally fixed to the torque receiving portion 2. The longitudinal axis of the handle 11 may coincide with a longitudinal axis of the torque receiving portion 2.

The shaft 6 may be configured to transmit torques larger than a predefined torque from the torque receiving portion 2 to the torque delivering portion 4, wherein at least one component chosen from the torque input portion 2 and the torque delivering portion 4 may be configured to deform upon being subjected to a torque larger than the predefined torque. For example, the at least one component may be made of a material having a lower hardness than that of the plurality of torque transmitting elements 8. Alternatively or additionally, the screw driving tool portion 9 or the surgical drill head may be made of a material having a lower hardness than that of the plurality of torque transmitting elements 8. Alternatively or additionally, the screw driving tool portion 9 or the surgical drill head may be configured to deform, upon being subjected to a torque larger than the predefined torque, such that, while being further subjected to the torque larger than the predefined torque, less torque (e.g., less than a predefined minimal torque) or no torque is transferred from the deformed screw driving tool portion (e.g., to the surgical screw) or from the surgical drill head (e.g., to the bone). For example, edges between lateral surfaces forming the screw driving tool portion 9 may deform such that the screw driving tool portion 9 becomes essentially cylindrical. This may avoid breaking of the surgical instrument 1000 or of a surgical implant downstream of the torque delivering portion 4 upon exerting overly large torques onto the torque receiving portion 2.

FIG. 2a shows a cross-section of the surgical instrument of FIG. 1 along the longitudinal axis 10, and FIG. 2b shows an enlarged portion A of FIG. 2a. The handle 11 is not illustrated in these figures. As can be seen, each of the torque transmitting elements 8 comprises a through-hole 12. The through-hole 12 may extend along the longitudinal direction 10, for example in a center of the shaft 6. The through-hole 12 may extend in a radial center and along an axial direction of the respective torque transmitting element 8.

The through-hole 12 may have a diameter varying along a length of the through-hole 12. The through-hole may have a wider diameter at the ends of the through-hole 12 compared with a central portion of the through-hole 12. One or both ends of the through-hole 12 may be conical. The width of the through-hole 12 may alternatively change non-linearly at one or both ends of the through-hole 12 along the length of the through-hole 12.

As illustrated in FIGS. 2a and 2b, the surgical instrument 1000 comprises an elongate alignment member 14 extending through the through-holes 12 of the plurality of torque transmitting elements 8. The alignment member 14 is made from a spring-elastic material. The alignment member 14 may be the only component extending through the through-holes 12.

The spring-elastic material may be a superelastic or pseudoelastic material. Pseudo- or superelasticity may designate an elastic, reversible response to an applied stress, caused by a phase transformation between an austenitic and martensitic phase of the material. The spring-elastic material may be a shape memory alloy, for example a nickel titanium alloy such as Nitinol.

In the illustrated example, the alignment member 14 consists of a spring wire 16. The spring wire 16 in this example does not form a coil, and is not rolled, wrapped or wound. The spring wire 16 may be a non-braided wire. The spring wire 16 may have a substantially circular or polygonal cross-section. The alignment member 14, in particular the spring wire 16, may have a diameter between 0.8 mm and 3 mm. The alignment member 14, in particular the spring wire 16, may have a length between 30 mm and 400 mm. The spring wire 16 may extend in a linear direction, for example at least within each of the through-holes 12. The spring wire may extend along the longitudinal direction 10 of the shaft 6.

The alignment member 14 may be configured to be elastically deformed when the shaft 6 is bent, and provide a spring force counteracting the bending of the shaft 6. To this end, the alignment member 14 may be configured to align the torque transmitting elements 8 in a predefined orientation relative to one another (e.g., along the longitudinal direction 10 of the shaft 6). This configuration may enable the shaft 6 to take a predefined shape when no bending torque is applied thereto. For example, the alignment member 14 may provide a spring force aligning the plurality of torque transmitting elements 8 so that the shaft 6 extends in a linear direction (i.e., has a straight extension).

The alignment member 14 may be configured to, when the torque transmitting elements 8 are in the predefined orientation relative to one another, fulfil at least one of the following criteria: a) the alignment member is in a state of a lowest elastic potential energy; b) the alignment member is free from a shear force; c) the alignment member is free from a bending moment; d) the alignment member is free from a tensile force.

The surgical instrument 1000 may comprise a recess 18 facing the shaft 6. The recess 18 may have an essentially cylindrical shape. The recess 18 may be configured as a blind hole. In the example shown in FIG. 2a, the recess 18 is formed in the torque delivering portion 4 and extends along a longitudinal direction of the torque delivering portion 4. The recess 18 may be arranged in a radial center of the torque delivering portion 4.

As can be seen in FIG. 2a, the torque receiving portion 2 may comprise a further recess configured, in the present variant, as a through-hole 20. The through-hole 20 may be directed towards the shaft 6 and may extend along the longitudinal direction 10 of the shaft 6. The through-hole 20 may be arranged in a radial center of the torque receiving portion 2 and may have an essentially cylindrical shape.

It is noted that the torque receiving portion 2 may comprise a blind hole facing the shaft 6 instead of the through-hole 20. Similarly, the torque delivering portion 4 may comprise a through-hole instead of the recess 18. In each scenario, the alignment member 14 may extend at least partially into the torque delivering portion 4. Alternatively or additionally, the alignment member 14 may extend at least partially into the torque receiving portion 2.

The alignment member 14 may be configured to align the shaft 6 in a predefined orientation relative to at least one component chosen from the torque delivering portion 4 and the torque receiving portion 2. The alignment member 14 in this case may extend at least partially into a through-hole or recess facing the shaft 6 and provided in the respective at least one component. As described above for the plurality of torque transmitting elements 8, this configuration may enable the shaft 6 and the respective at least one component to take a predefined shape when no external bending moment is applied thereon. For example, the alignment member 14 may provide a spring force aligning the plurality of torque transmitting elements 8 and the respective at least one component such that both the shaft 6 and the respective at least one component extend in a linear direction.

The alignment member 14 may be configured to, when the shaft 6 is in the predefined orientation relative to the at least one component, fulfil at least one of the following criteria: a) the alignment member is in a state of a lowest elastic potential energy; b) the alignment member is free from a shear force; c) the alignment member is free from a bending moment; d) the alignment member is free from a tensile force. The alignment member 14 may be configured to extend linearly (e.g., in a linear direction) when being in the state of a lowest elastic potential energy.

The alignment member 14 may "stiffen" the surgical instrument 1000 such that it extends in an essentially linear direction, while providing for a selected degree of flexibility of the shaft 6. Thus, the surgical instrument 1000 may be more easily handled by a surgeon. For instance, aligning the surgical instrument 1000 using the handle 11 such that the torque delivering portion 4 is at in predefined position may be facilitated.

In a first variant, at least two of the plurality of torque transmitting elements 8 may be manufactured, by additive manufacturing, being coupled to one another in series. Alternatively or additionally, the at least one component (chosen from the torque delivering portion 4 and the torque receiving portion 2) may be manufactured, by additive manufacturing, being coupled to one of the plurality of torque transmitting elements 8. The additive manufacturing may comprise or consist of three-dimensional printing, for example VAT photopolymerization, material jetting, binder jetting, powder bed fusion, material extrusion, directed energy deposition or sheet lamination. The additive manufacturing may comprise selective laser sintering.

In a second variant, at least two of the plurality of torque transmitting elements 8 may be manufactured by at least one process selected from forming, pressing, molding and machining, and may be coupled to an adjacent one of the plurality of torque transmitting elements 8 by assembling. The assembled torque transmitting elements 8 may then be hardened, for example using a heat treatment. Alternatively or additionally, the at least one component (chosen from the torque delivering portion 4 and the torque receiving portion 2) may be manufactured, by the at least one process, and may be coupled to one of the plurality of torque transmitting elements 8 by assembling. The assembled component and torque transmitting element(s) 8 may then be hardened, for example using a heat treatment.

The above manufacturing variants, especially the first variant, may decrease manufacturing costs of the surgical instrument 1000 and enable coupling torque transmitting elements 8 having advantageous geometrical forms as will be described further below with reference to FIGS. 3a-3d.

The alignment member 14 may be translationally movable along at least one direction chosen from the longitudinal direction 10 of the shaft 6, a first longitudinal axis of the torque delivering portion 4 and a second longitudinal axis of the torque receiving portion 2. The alignment member 14 may not be attached (e.g., not be welded, soldered, clamped or otherwise fastened) to one or more components of the surgical instrument 1000 chosen from the torque receiving portion 2, the torque delivering portion 4 and the shaft 6. One may say that the alignment member 14 in in some variants of the first option is arranged as a (e.g., at least axially) free-floating element within the surgical instrument 1000. The alignment member 14 may be arranged such that no tensile forces are applied thereon when bending the shaft 6. The alignment member 14 may be configured to be bent, but not stretched along a longitudinal axis thereof when bending the shaft 6 (e.g., when bending the shaft 6 such that the plurality of torque transmitting elements 8 are misaligned from the predefined relative orientation).

It has been found that certain attachment techniques, such as welding or clamping, disadvantageously affect the spring-elastic properties of the alignment member 14 (e.g., due to the heat used in the attachment process or the mechanic stress resulting from clamping). It has further been found that certain spring-elastic materials such as Nitinol can easily get damaged upon application of tensile forces.

Providing the alignment member 14 as a free-floating component may further decrease manufacturing costs, as not attachment between the alignment member 14 and other components of the surgical instrument 1000 may be required. This approach may also increase the lifetime of the surgical instrument 1000, as the alignment member 14 may be subjected to less mechanical stress compared with a configuration in which it is attached to a component of the surgical instrument 1000.

FIGS. 3*a*-3*d* show different views of the torque transmitting element 8 of the surgical instrument 1000 of FIG. 1. Each of the torque transmitting elements 8 may be configured to couple to an adjacent one of the plurality of torque transmitting elements 8 of the shaft 6 such that the coupled torque transmitting elements 8 are translationally fixed relative to one another in the longitudinal direction 10 of the shaft 6. In other words, one torque transmitting element 8 may be configured to couple to an adjacent one of the torque transmitting elements 8 such that the two coupled torque transmitting elements 8 cannot be (e.g., non-destructively) decoupled from one another (e.g., by pulling the two torque transmitting elements 8 apart in the longitudinal direction 10). To this end, each of the plurality of torque transmitting elements 8 may comprise a female coupling feature 22 and a male coupling feature 24 matching the female coupling feature 22 of an adjacent one of the plurality of torque transmitting elements 8. The plurality of torque transmitting elements may be coupled in series by the male coupling features 24 and the female coupling features 22 of the plurality of torque transmitting elements 8.

As illustrated in FIGS. 3*a*-3*d*, the female coupling feature 22 may comprise an essentially bucket-shaped receptacle 26 (e.g., for the male coupling feature 24 of an adjacent one of the plurality of torque transmitting elements 8) that is substantially closed in a circumferential direction around a longitudinal axis of the coupling feature 22.

The male coupling feature 24 may comprise or consist of a protrusion 28 configured to fit into the receptacle 26 (e.g., of another adjacent one of the plurality of torque transmitting elements 8). The receptacle 26 may be configured to house the protrusion 28 of the adjacent one of the plurality of torque transmitting elements 8, and the protrusion 28 may be configured to be received by the receptacle 26 of the another adjacent one of the plurality of torque transmitting elements 8. Each of the plurality of torque transmitting elements 8 may have the same geometry. In this case, one may say that the protrusion 28 of a particular torque transmitting element 8 may be sized such that it theoretically fits into the receptacle 26 of that particular torque transmitting element 8.

The receptacle 26 may have a polygonal inner circumference substantially matching an outer circumference of the protrusion 28. The polygonal inner circumference may have the shape of a (e.g., regular) convex polygon, for example a hexagon. Similarly, the outer circumference of the protrusion 28 may have the shape of a (e.g., regular) convex polygon, for example a hexagon. The outer circumference may be a circumference around the longitudinal direction 10 of the shaft 6 and the inner circumference may be a circumference around the longitudinal direction 10 of the shaft 6. The outer circumference of the protrusion 28 may have a constant geometrical form varying only in size along the longitudinal direction 10.

The inner circumference of the receptacle 26 may be rotationally offset from the outer circumference of the protrusion 28 (e.g., by 30 degrees). The inner circumference of the receptacle 26 may be rotationally offset from the outer circumference of the protrusion 28 such that corners of the inner circumference lie on edges of the outer circumference. Thereby, a first torque transmitting element 8 coupled to a second first torque transmitting element 8 may be tilted along a first set of tilting directions (e.g., in a first set of tilting planes). Furthermore, a third torque transmitting element 8 coupled to the second first torque transmitting element 8 may be tilted along a second set of tilting directions (e.g., in a second set of tilting planes). The first set of tilting directions or planes may differ from the second set of tilting directions or planes. For instance, the first set of tilting planes may be rotationally offset from the second set of tilting planes by a predefined angle (e.g., 10°, 15°, 30°, 45° or 60°). The male coupling feature 24 and the female coupling feature 22 may be misaligned relative to one another (e.g., rotationally offset). This may lead to an adjacent torque transmitting element 8 being rotationally offset from the torque transmitting element 8 to which it is coupled.

The receptacle 26 may have the form of a (e.g., right) prism or cylinder. The protrusion 28 may comprise a segment having the form of a (e.g., right) prism or cylinder with a rounded top. The protrusion 28 may comprise a segment having a plurality convex outer surfaces. The protrusion 28 may have a varying thickness along the longitudinal direction 10 of the shaft 6. The outer circumference mentioned above may be an outer circumference of a portion of the protrusion 28 having a highest thickness. A cross-section of the protrusion in a plane along the longitudinal direction 10 of the shaft 6 may be convexly rounded, for example be at least partially or overall spherical. This shape is apparent when referring to FIGS. 3*a* and 3*d*, for example.

The female coupling feature 22 may further comprise a retainment feature 30, such as a retainment lip, extending radially inwards from an inner surface of the receptacle 26. The retainment feature 30 may be configured to prevent a (e.g., non-destructive) decoupling of the protrusion 28 of the adjacent one of the plurality of torque transmitting elements 8 coupled to the receptacle 26. One may say that the retainment feature 30 acts as an axial barrier or stop, preventing a (e.g., non-destructive) decoupling of the protrusion 28 of the adjacent one of the plurality of torque transmitting elements from the receptacle 26. The retainment feature 30 may be configured such that an inner circumference thereof at least partially overlaps or lies within the outer circumference of the protrusion 28 of the adjacent one of the plurality of torque transmitting elements coupled to the receptacle 26. When manufacturing the shaft 6, using additive manufacturing as described above may be advantageous as it allows manufacturing the shaft 6 as a whole, with the torque transmitting elements 8 being coupled to one another and held in place by the retainment features 30.

The receptacle 26 may be radially enclosed or formed by a side wall 32 of the torque transmitting element 8. The side wall 32 may have an overall cylindrical outer surface and the polygonal inner surface. The side wall 32 may comprise at least one through-hole 34 connecting a space within the receptacle (e.g., close to the longitudinal direction 10) with a space outside the receptacle 26 (e.g., remote from the longitudinal direction 10).

The at least one through-hole 34 may be cylindrical, prismatic or have another geometrical form. The at least one through-hole 34 may extend perpendicular or, alternatively, skewed to the outer surface of the side wall 32. Alternatively or additionally, the at least one through-hole 34 may extend perpendicular or, alternatively, skewed to the inner surface of the receptacle 26. The at least one through-hole 34 may comprise a plurality of through-holes (e.g., arranged symmetrically on the torque transmitting element 8).

When the protrusion 28 of the adjacent one of the plurality of torque transmitting elements 8 is coupled to the receptacle 26, the coupled protrusion 28 may (e.g., temporarily or permanently) contact the inner surface or wall of the receptacle 26 in a contact area 35 of the inner surface or wall (e.g., when the plurality of torque transmitting elements 8 are in the predefined orientations, when the shaft 6 extends in the linear direction and/or when the shaft is bent). The at least one through-hole 34 may be arranged distant from the contact area 35. For example, the at least one through-hole may be arranged at a longitudinal end of the receptacle 26.

The at least one through-hole 26 may be configured to allow a fluid medium entering (and, optionally, leaving) the receptacle 26 even if the protrusion 28 of the adjacent one of the plurality of torque transmitting elements 8 is coupled to the receptacle 26. This may help in cleaning or sterilizing the surgical instrument 1000.

FIGS. 4a-4d show different views of a torque delivering portion 4 of the surgical instrument 1000 of FIG. 1. As can be seen, the torque delivering portion 4 in this example comprises a hexagonal screw driving tool portion 9 at a longitudinal end thereof. At an opposite longitudinal end, the torque delivering portion 4 comprises a coupling feature 36 configured to couple to the second of the plurality of torque transmitting elements 8 of the shaft 6. In the illustrated example, the torque delivering portion 4 comprises a receptacle 37 configured to couple to the protrusion 28 of the second of the plurality of torque transmitting elements 8. The receptacle 37 may be configured similar to the receptacle 26 described above, and may comprise a corresponding retainment feature 38 and a corresponding at least one through-hole 40. It is noted that in an alternative implementation, the coupling feature 36 may be a male coupling feature such as the protrusion 28 described above.

FIGS. 5a-5d show different views of a torque receiving portion 2 of the surgical instrument 1000 of FIG. 1. As can be seen, the torque receiving portion 2 in this example comprises a handle or actuator coupling portion 42 at a longitudinal end thereof. The coupling portion 42 may be essentially cylindrical. At an opposite longitudinal end, the torque receiving portion 2 comprises a coupling feature 43 configured to couple to the first of the plurality of torque transmitting elements 8 of the shaft 6. In the illustrated example, the torque receiving portion 2 comprises a protrusion 44 configured to couple to the receptacle 26 of the first of the plurality of torque transmitting elements 8. The protrusion 44 may be configured similar to the protrusion 28 described above and may have a polygonal outer circumference. It is noted that in an alternative implementation, the coupling feature 43 may be a female coupling feature such as the receptacle 26 described above.

In the embodiment of the surgical instrument 1000 described herein, the shaft may comprise torque transmitting elements with two female coupling features. Alternatively or additionally, the shaft may comprise torque transmitting elements with two male coupling features. Various combinations are possible. For instance, the shaft may comprise at least two elements selected from: (i) one or more torque transmitting elements having a male and a female coupling portion; (ii) one or more torque transmitting elements having two male coupling portions; and (iii) one or more torque transmitting elements having two female coupling portions. The shaft may comprise at least one torque transmitting element having different types of (e.g., male or female) coupling portions, for example one (e.g., male or female) coupling portion as described above with reference to FIGS. 3a-3d and another (e.g., male or female) coupling portion. Similar modifications are possible with regard to the torque receiving portion and the torque delivering portion, as long as these each comprise a (e.g., male or female) coupling portion matching a coupling portion of an adjacent one (e.g., the first or second) of the plurality of torque transmitting elements of the shaft.

Figure 6:
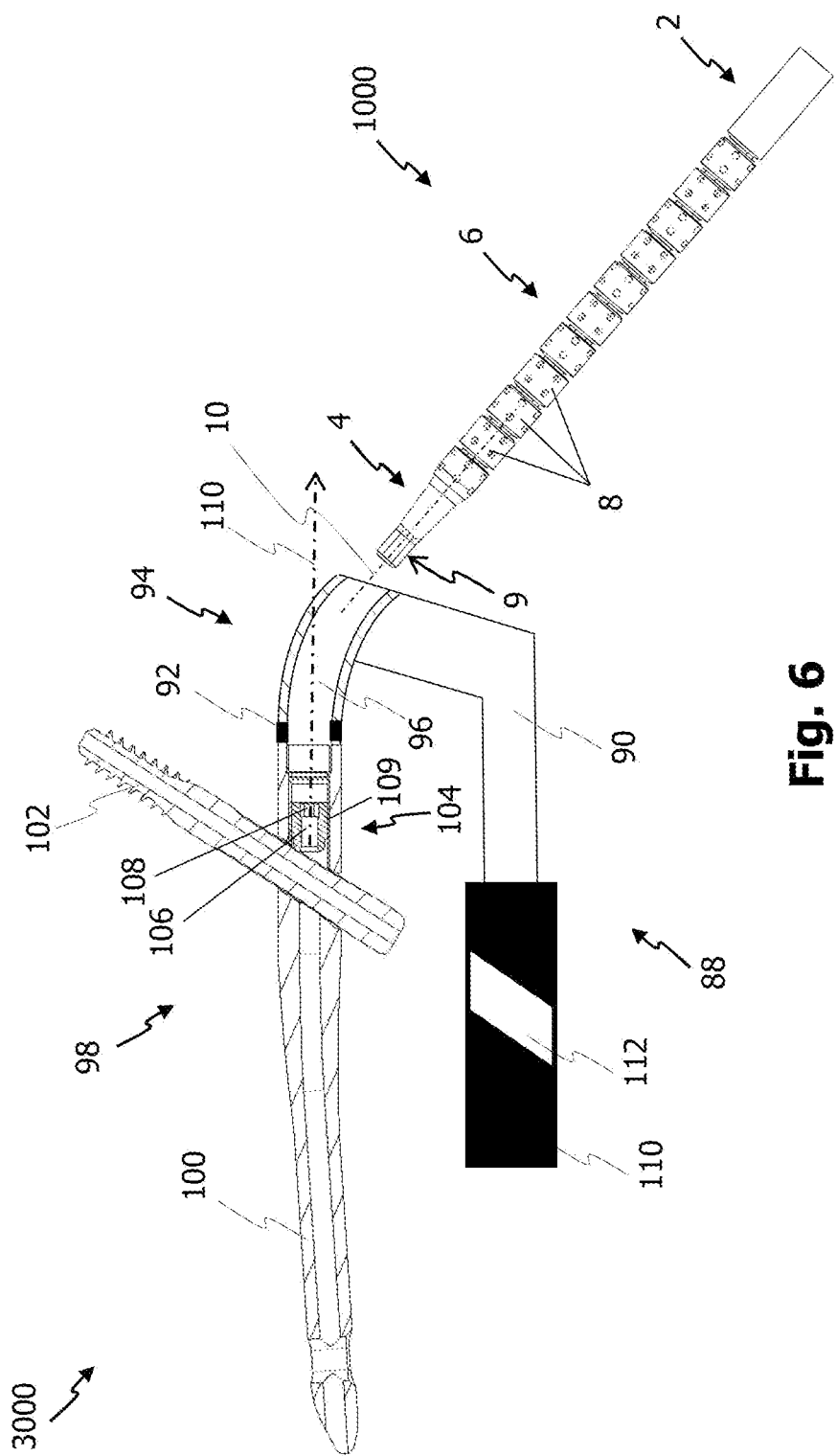
FIG. 6 shows a system in accordance with the present disclosure.

FIG. 6 shows a system 3000 in accordance with the present disclosure. The system 3000 comprises the surgical instrument 1000 as described above.

The system 3000 further comprises an implant placement instrument 88 comprising a handle 90 and a coupling portion 92 configured to removably couple to an implant. The implant placement instrument 88 further comprises a guiding structure 94 configured to guide the torque delivering portion 4 of the surgical instrument 1000 to a predefined position relative to the coupling portion 92. The guiding structure 94 comprises a channel 96 extending along a curve.

The system 3000 may further comprise an implant 98. The coupling portion 92 may be configured to couple to (e.g., a corresponding coupling portion of) the implant 98. The implant placement instrument 88 may be configured for removably holding the implant 98, for example for positioning the coupled implant 98 at an intended location using the handle 90.

The implant 98 may comprise two implant portions 100, 102 movably attachable to one another. The implant 98 may further comprise a locking mechanism 104 configured to lock the two implant portions 100, 102 relative to one another. The locking mechanism 104 may comprise a surgical screw 106. The guiding structure 94 may be configured to guide the torque delivering portion 4 of the surgical instrument 1000 to a head 108 of the surgical screw 106.

The implant portion 100 may be an intramedullary nail and the implant portion 102 may be a bone fastener configured to penetrate a transverse bore of the intramedullary nail 100 to movably attach to the intramedullary nail 100. The locking mechanism 104 may further comprise a screw thread 109 extending along a longitudinal axis 110 of the intramedullary nail 100. The surgical screw 106 of the locking mechanism 104 may be configured to couple with the screw thread 109.

The implant placement instrument 88 may further comprise an alignment element 110. The alignment element 110 may be spatially fixed relative to the coupling portion 92, and may for example be attached to the handle 90. The alignment element 110 may comprise an alignment hole 112 configured to align a surgical instrument (not shown) in a predefined pose relative to the coupling portion 92. For example, a drill may be inserted through the alignment hole 112 and a hole may be drilled in the predefined pose. This may enable inserting the bone fastener 102 in the predefined pose relative to the intramedullary nail 100, ensuring a proper (e.g., movable) attachment between these two elements 100, 102. Upon fastening the screw 106 using the surgical instrument 1000, a relative movement between the bone fastener 102 and the intramedullary nail 100 may be blocked.

Figure 7:
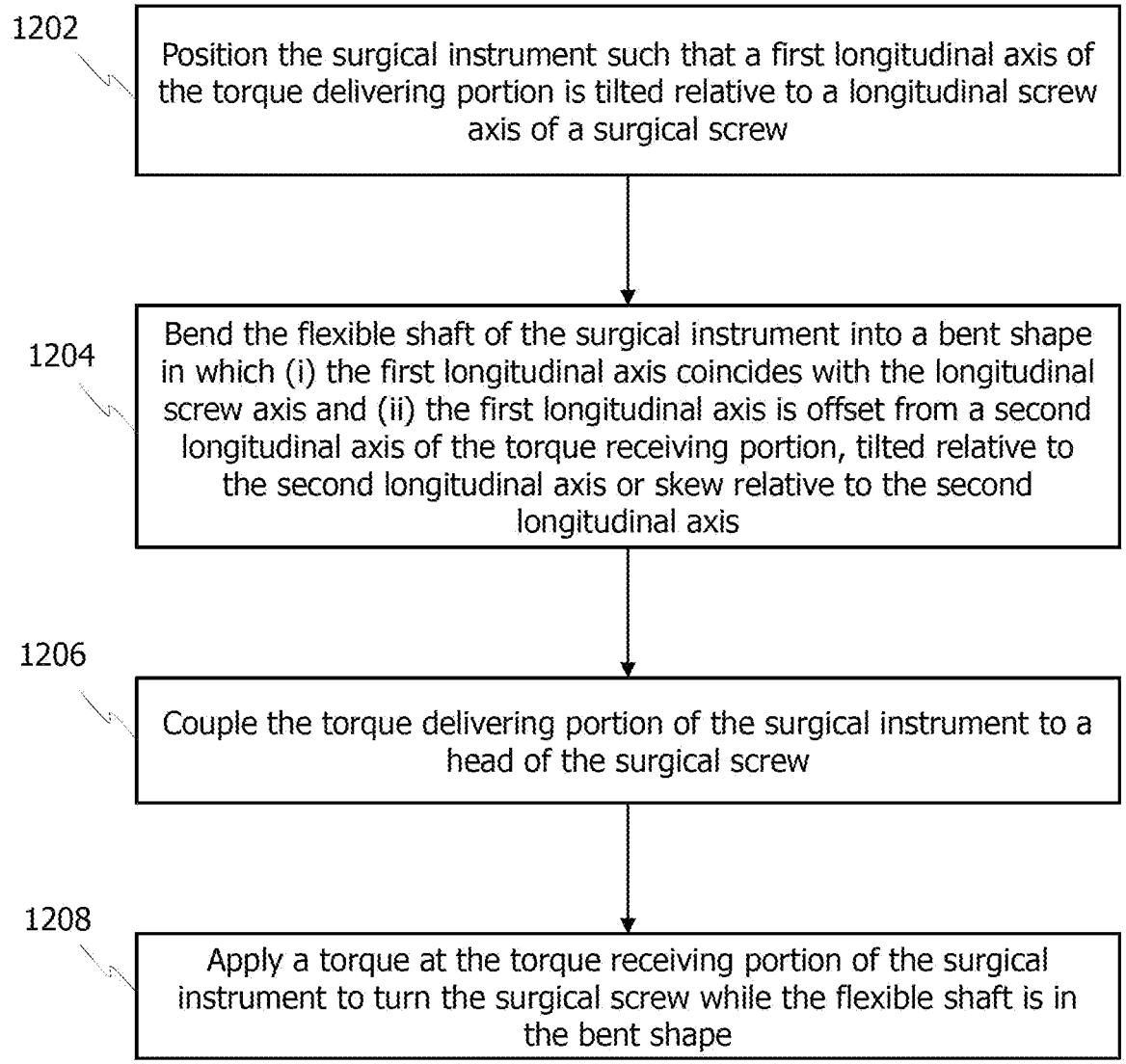
FIG. 7 shows a method in accordance with the present disclosure.

FIG. 7 is a flow diagram of a method in accordance with the present disclosure. The method comprises a step 1202 of positioning the surgical instrument 1000 such that the first a longitudinal axis of the torque delivering portion 4 is tilted relative to a longitudinal screw axis (e.g., coinciding with or corresponding to the axis 90) of a surgical screw (e.g., the screw 106). The method further comprises a step 1204 of bending the flexible shaft 6 of the surgical instrument 1000 into a bent shape in which (i) the first longitudinal axis coincides with the longitudinal screw axis and (ii) the first longitudinal axis is offset from the second longitudinal axis of the torque receiving portion 2, tilted relative to the second longitudinal axis or skew relative to the second longitudinal axis. The method further comprises a step 1206 of coupling the torque delivering portion 4 of the surgical instrument 1000 to a head of the surgical screw, and a step 1208 of applying a torque at the torque receiving portion 2 of the surgical instrument 1000 to turn the surgical screw while the flexible shaft 6 is in the bent shape.

Referring again to FIG. 6, the longitudinal axis of the torque delivering portion 4 may in an initial state of the surgical instrument 1000 correspond to the longitudinal direction 10 of the shaft 6. The instrument 1000 may extend in an essentially linear direction. As can be seen, the axis 90, that may coincide with the longitudinal axis of the screw 106, is tilted relative to the direction 10. Thus, in order for the screw 106 to be fastened, the torque delivering portion 4 of the surgical instrument 1000, comprising the screw driving tool portion 9, must be aligned with the screw axis.

One way achieve this would be simply tilting the overall instrument 1000 relative to the screw 106. Nevertheless, this might not be possible due to restricted operating room. Especially in case of hip surgery, where the intramedullary nail 100 is to be inserted into a femoral bone of a patient, the space above the screw head 108 in the direction 110 might be quite limited (e.g., below 5 cm or below 10 cm).

The system may enable the surgical instrument 1000 to advance from a tilted angle relative to the screw axis of the screw 106. The torque delivering portion 4 of the surgical instrument 1000 (e.g., extending linearly as shown in FIG. 6) may be inserted into the guiding structure 94 and advanced toward the surgical screw 106. In case the surgical instrument 1000 is in a predefined shape (e.g., in case the shaft 6 is aligned by the alignment member 14), for example a linear shape as shown in FIG. 6, the insertion of the torque delivering portion 4 into the channel 96 may be facilitated. By advancing the torque delivering portion 4 of the surgical instrument 1000 inside the channel 96 along the curve of the guiding structure 94, the shaft 6 may be bent to follow the shape of the channel 96. At some point, the torque delivering portion 4 may reach the screw head 108 of the surgical screw 106. Torque may then be applied to the torque receiving portion 2 around a longitudinal axis thereof. This torque may then be transmitted by the plurality of torque transmitting elements 8 onto the torque delivering portion 4, which may thereby fasten the screw 106 along the screw thread 109. Fastening the screw 106 may exert a force onto the implant portion 102, thereby shifting the locking mechanism 104 into a locked configuration (e.g., locking the two implant portions 100, 102 relative to one another).

In case a torque exceeding a predefined maximal torque is applied onto the torque receiving portion 2, the torque delivering portion 4 or the torque receiving portion 2 may deform, thereby preventing breakage of the surgical instrument 1000. This may avoid broken parts of the surgical instrument 1000 remaining in the channel 96 when retracting the surgical instrument 1000 therefrom.

The method may be conducted before implanting the implant 98 in a patient's body, or after implanting the implant 98 in the patient's body. The method in some variants may be conducted using a cadaver or a dummy instead of a live human or animal body. In some variants, the method does not involve any substantial interaction with the human or animal body, in particular no surgical or therapeutic step.

Numerous modifications of the surgical instrument 1000, the system 3000 and the method described herein may be possible. The method may be used with a system differing from that described with reference to FIG. 6. Other variations will be apparent to those skilled in the art. Although numerous advantages have been described herein, the claimed subject matter is not limited thereto. Those skilled in the art will be aware of additional or alternative advantages and technical effects that may be obtained with the subject matter disclosed herein.

The invention claimed is:

1. A surgical instrument for transmitting torque, the surgical instrument comprising:
   a torque receiving portion at a proximal end of the surgical instrument;
   a torque delivering portion at a distal end of the surgical instrument;
   a flexible shaft extending between the torque receiving portion and the torque delivering portion, the flexible shaft comprising torque transmitting elements coupled in series along a longitudinal direction of the shaft such that one of the torque transmitting elements is rotationally fixed and tiltable relative to an adjacent one of the torque transmitting elements, wherein each of the torque transmitting elements comprises a through-hole; and
   an elongate alignment member extending through the through-holes of the torque transmitting elements, wherein the alignment member is made from a spring-elastic material, wherein the alignment member extends only partially through at least one of the torque receiving portion and the torque delivering portion, and wherein the alignment member is translationally movable along at least one direction.

2. The surgical instrument of claim 1, wherein the alignment member comprises or consists of a spring wire.

3. The surgical instrument of claim 2, wherein the spring wire is a non-braided wire.

4. The surgical instrument of claim 1, wherein the spring-elastic material is a superelastic or pseudoelastic material.

5. The surgical instrument of claim 1, wherein the alignment member is configured to align the torque transmitting elements in a predefined orientation relative to one another.

6. The surgical instrument of claim 1, wherein the alignment member is configured to, when the torque transmitting elements are in a predefined orientation relative to one another, fulfil at least one of the following criteria:
   a) the alignment member is in a state of a lowest elastic potential energy;
   b) the alignment member is free from a shear force;
   c) the alignment member is free from a bending moment;
   d) the alignment member is free from a tensile force.

7. The surgical instrument of claim 1, wherein the at least one direction is chosen from the longitudinal direction of the shaft, a first longitudinal axis of the torque delivering portion and a second longitudinal axis of the torque receiving portion.

8. The surgical instrument of claim 1, wherein the alignment member is not attached to one or more components of the surgical instrument chosen from the torque receiving portion, the torque delivering portion and the shaft.

9. The surgical instrument of claim 1, wherein the alignment member is arranged as an at least axially free-floating element within the surgical instrument.

10. The surgical instrument of claim 1, wherein the through-hole has a varying diameter.

11. The surgical instrument of claim 10, wherein the through-hole has a wider diameter at one or both ends of the through-hole compared with a portion of the through-hole spaced apart from the respective end of the through-hole.

12. The surgical instrument of claim 1, wherein the shaft is configured to transmit torques larger than a predefined torque from the torque receiving portion to the torque delivering portion, wherein at least one component chosen from the torque receiving portion and torque delivering portion is configured to deform upon being subjected to a torque larger than the predefined torque.

13. The surgical instrument of claim 1, wherein at least two of the torque transmitting elements are manufactured, by additive manufacturing, being coupled to one another in series.

14. The surgical instrument of claim 1, wherein one of the torque transmitting elements comprises a female coupling feature and an adjacent one of the torque transmitting elements comprises a male coupling feature matching the female coupling feature, wherein the one of the torque transmitting elements is coupled to the adjacent one of the torque transmitting elements via the female coupling feature and the male coupling feature, wherein the female coupling feature comprises a receptacle, and the male coupling feature comprises a protrusion sized to fit into the receptacle.

15. The surgical instrument of claim 14, wherein
the female coupling feature further comprises a retainment feature extending radially inwards from an inner surface of the receptacle, the retainment feature configured to prevent a decoupling of the protrusion of the adjacent one of the plurality of torque transmitting elements coupled to the receptacle.

16. The surgical instrument of claim 14, wherein the receptacle is radially enclosed by a side wall of the torque transmitting element comprising the receptacle, the side wall comprising at least one through-hole connecting a space within the receptacle with a space outside the receptacle.

17. The surgical instrument of claim 16, wherein a contact area of an inner surface of the receptacle of the one of the torque transmitting elements is configured to contact an outer surface of the protrusion of the adjacent one of the torque transmitting elements coupled to the receptacle, wherein the at least one through-hole is arranged distant from the contact area.

18. A system comprising:
a surgical instrument for transmitting torque, the surgical instrument comprising:
a torque receiving portion at a proximal end of the surgical instrument;
a torque delivering portion at a distal end of the surgical instrument;
a flexible shaft extending between the torque receiving portion and the torque delivering portion, the flexible shaft comprising torque transmitting elements coupled in series along a longitudinal direction of the shaft such that one of the torque transmitting elements is rotationally fixed and tiltable relative to an adjacent one of the torque transmitting elements, wherein each of the torque transmitting elements comprises a through-hole; and
an elongate alignment member extending through the through-holes of the torque transmitting elements, wherein the alignment member is made from a spring-elastic material; and
an implant placement instrument comprising a handle and a coupling portion configured to removably couple to an implant, the implant placement instrument further comprising a guiding structure configured to guide the torque delivering portion of the surgical instrument to a predefined position relative to the coupling portion, the guiding structure comprising a channel extending along a curve.

19. A method of using a surgical instrument, the method comprising:
providing a surgical instrument for transmitting torque, the surgical instrument comprising:
a torque receiving portion at a proximal end of the surgical instrument;
a torque delivering portion at a distal end of the surgical instrument;
a flexible shaft extending between the torque receiving portion and the torque delivering portion, the flexible shaft comprising torque transmitting elements coupled in series along a longitudinal direction of the shaft such that one of the torque transmitting elements is rotationally fixed and tiltable relative to an adjacent one of the torque transmitting elements, wherein each of the torque transmitting elements comprises a through-hole; and
an elongate alignment member extending through the through-holes of the torque transmitting elements, wherein the alignment member is made from a spring-elastic material, wherein the alignment member extends only partially through at least one of the torque receiving portion and the torque delivering portion, and wherein the alignment member is translationally movable along at least one direction;
positioning the surgical instrument such that a first longitudinal axis of the torque delivering portion is tilted relative to a longitudinal screw axis of a surgical screw;
bending the flexible shaft of the surgical instrument into a bent shape in which the first longitudinal axis coincides with the longitudinal screw axis;
coupling the torque delivering portion of the surgical instrument to a head of the surgical screw; and
applying a torque at the torque receiving portion of the surgical instrument to turn the surgical screw while the flexible shaft is in the bent shape.

20. The method of claim 19, wherein bending the shaft comprises at least one action chosen from (i) bending the shaft to conform with at least a part of a predefined curve and (ii) advancing the torque delivering portion of the surgical instrument along a guiding structure of an implant placement instrument.

* * * * *